United States Patent
Chen et al.

(10) Patent No.: US 12,546,931 B2
(45) Date of Patent: Feb. 10, 2026

(54) BACKLIGHT MODULE, VIEWING MODE SWITCHING METHOD THEREOF, AND DISPLAY DEVICE INCLUDING THE BACKLIGHT MODULE

(71) Applicant: Radiant Opto-Electronics Corporation, Kaohsiung (TW)

(72) Inventors: Chia-Ying Chen, Kaohsiung (TW); Jing-Hu Jheng, Kaohsiung (TW); Tsung-Shun Yang, Kaohsiung (TW); Yen-Chang Lee, Kaohsiung (TW); I-Wen Fang, Kaohsiung (TW); Ya-Yun Hsieh, Kaohsiung (TW); Pei-Yu Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 19/081,666

(22) Filed: Mar. 17, 2025

(65) Prior Publication Data
US 2025/0208333 A1  Jun. 26, 2025

Related U.S. Application Data

(63) Continuation of application No. PCT/CN2023/139551, filed on Dec. 18, 2023.

(51) Int. Cl.
*F21V 8/00* (2006.01)
(52) U.S. Cl.
CPC ......... *G02B 6/0053* (2013.01); *G02B 6/0051* (2013.01); *G02B 6/0076* (2013.01)

(58) Field of Classification Search
CPC ... G02B 6/0053; G02B 6/0051; G02B 6/0076
See application file for complete search history.

(56) References Cited

U.S. PATENT DOCUMENTS

| | | | |
|---|---|---|---|
| 2008/0112187 A1* | 5/2008 | Katsumata | G02B 6/0076 362/611 |
| 2017/0153383 A1* | 6/2017 | Lee | G02B 6/0068 |

(Continued)

FOREIGN PATENT DOCUMENTS

| | | |
|---|---|---|
| CN | 102640039 A | 8/2012 |
| CN | 106814502 A | 6/2017 |

(Continued)

*Primary Examiner* — Christopher E Dunay

(57) ABSTRACT

A backlight module comprising an upper backlight unit, and a lower backlight unit positioned beneath the upper backlight unit. The upper backlight unit includes an upper light source, an upper light guide plate for receiving light emitted from the upper light source, and a first prism sheet located on the light-emitting side of the upper light guide plate. The first prism sheet includes multiple first prisms arranged along a first direction, where the first prisms extend along a second direction, and their tips are oriented towards the upper light guide plate. The upper light source includes multiple light-emitting elements arranged along the second direction. When both the upper and lower backlight units are turned on, it operates in a wide viewing mode, and when the upper backlight unit is turned on while the lower backlight unit is turned off, it operates in a narrow viewing mode, thereby providing a switching function between the wide viewing angle mode and the narrow viewing angle mode for the backlight module. The invention also provides a display device including the backlight module.

18 Claims, 8 Drawing Sheets

(56) References Cited

U.S. PATENT DOCUMENTS

| | | | | |
|---|---|---|---|---|
| 2017/0329073 A1* | 11/2017 | Liu | ................ | G02B 6/0068 |
| 2019/0369319 A1* | 12/2019 | Oki | ................ | G02B 6/0063 |
| 2023/0101373 A1* | 3/2023 | Kim | ................ | G02B 6/0036 |
| | | | | 362/613 |
| 2023/0288753 A1* | 9/2023 | Shiau | ................ | G02F 1/133615 |
| 2024/0126001 A1* | 4/2024 | Chiu | ................ | G02B 6/0076 |
| 2025/0044493 A1* | 2/2025 | Chiu | ................ | G02B 6/0035 |

FOREIGN PATENT DOCUMENTS

| | | |
|---|---|---|
| CN | 207586464 U | 7/2018 |
| CN | 111176016 A | 5/2020 |
| CN | 215867450 U | 2/2022 |
| CN | 114930206 A | 8/2022 |
| CN | 115576133 A | 1/2023 |
| CN | 218497186 U | 2/2023 |
| CN | 115981052 A | 4/2023 |
| CN | 116466515 A | 7/2023 |
| KR | 1020180021597 A | 3/2018 |
| TW | 201740169 A | 11/2017 |
| TW | 202331375 A | 8/2023 |

\* cited by examiner

BACKLIGHT MODULE, VIEWING MODE SWITCHING METHOD THEREOF, AND DISPLAY DEVICE INCLUDING THE BACKLIGHT MODULE

RELATED APPLICATIONS

This application is a continuation application of International Application No. PCT/CN2023/139551, filed on Dec. 18, 2023, which claims priority to China Application Serial Number 202311286718.7, filed on Oct. 7, 2023. The entire disclosures of all the above applications are hereby incorporated by reference.

FIELD OF THE INVENTION

The present invention relates to an optical device, particularly to a backlight module and a display device capable of generating various viewing angle modes.

BACKGROUND OF THE INVENTION

With the advancement of technology, electronic devices equipped with liquid crystal displays have become indispensable items in modern life. However, users have different requirements for the viewing angles of display devices in various situations. For example, when users want to share information on the screen with others, the display device needs to have a wide viewing angle so that multiple people can see the contents on the screen from different angles, which is referred to as the sharing mode. On the other hand, when handling personal affairs and desiring privacy, users want the displayed screen to be visible only to themselves. In this case, the display device needs to have a narrow viewing angle function, which is referred to as the privacy mode.

As the number of in-vehicle displays increases, it is essential for displays other than the dashboard to be able to switch viewing angles to prevent driver distraction and ensure driving safety. Traditionally, if a display requires privacy, the simplest approach is to add a privacy filter on the outermost layer. However, a significant drawback of this method is that it often noticeably reduces brightness. Alternatively, controlling different viewing angles through the display panel itself requires an active, dedicated display panel for each viewing angle mode, which can result in higher manufacturing costs.

SUMMARY OF THE INVENTION

One object of the present invention is to provide a backlight module and display device that can be applied to various usage environments, capable of actively switching perspectives, without increasing manufacturing costs or reducing brightness.

The backlight module includes an upper backlight unit, and a lower backlight unit positioned beneath the upper backlight unit. The upper backlight unit includes an upper light source, an upper light guide plate receiving light emitted from the upper light source, and a first prism sheet positioned on a light-exiting side of the upper light guide plate. The first prism sheet includes a plurality of first prisms arranged along a first direction, each of the first prisms extending in a second direction with its tip facing the upper light guide plate, and the upper light source includes a plurality of light-emitting elements arranged along the second direction.

In a preferable embodiment, the upper light guide plate has an incident surface facing the upper light source, a bottom surface connecting to the incident surface and facing the lower backlight unit, and a plurality of light control structures disposed on the bottom surface. Each of the light control structures having an light receiving surface directed toward the incident surface and a opposite light receiving surface connected to the light receiving surface and away from the incident surface. Wherein, a first angle is formed between the light receiving surface and the bottom surface, and a second angle is formed between the opposite light receiving surface and the bottom surface, with the first angle being greater than the second angle.

In a preferable embodiment, at a position adjacent to the upper light source, the area ratio of the light control structures to the bottom surface of the upper light guide plate is smaller compared to the area ratio of the light control structures to the bottom surface of the upper light guide plate at a position farther from the upper light source.

In a preferable embodiment, at a position adjacent to the upper light source, the size of the light control structures is smaller compared to the size of the light control structures at a position farther from the upper light source.

In a preferable embodiment, at a position adjacent to the upper light source, the spacing between adjacent light control structures is greater than the spacing between adjacent light control structures at a position farther from the upper light source.

In a preferable embodiment, the upper light guide plate further includes an exit surface connected to the incident surface and opposing the bottom surface, and a plurality of strip-shaped microstructures disposed on the exit surface, the strip-shaped microstructures being oriented toward the first prism sheet and extending along the first direction.

In a preferable embodiment, the lower backlight unit includes two diffusion sheets, with the upper diffusion sheet directly facing the upper light guide plate of the upper backlight unit, and no other components obstructing between them.

In a preferable embodiment, the lower backlight unit includes a lower light source, a lower light guide plate receiving light emitted from the lower light source, and at least one optical film positioned on an exit side of the lower light guide plate. The lower light guide plate has an incident side connected to the exit side, with the incident side receiving light emitted from the lower light source.

In a preferable embodiment, the lower backlight unit includes a lower light source, a diffusion plate receiving light from the lower light source, and at least one optical film positioned on an exit side of the diffusion plate. The diffusion plate has an incident side opposite the exit side, with the incident side receiving light emitted from the lower light source.

In a preferable embodiment, the lower backlight unit includes a plurality of optical films, comprising two diffusion sheets and two second prism sheets positioned between the two diffusion sheets. Each of the second prism sheets includes a plurality of second prisms, with the tips of the second prisms on each second prism sheet facing the upper backlight unit, and the second prisms of the two second prism sheets extending in different directions.

Another object of the present invention is to provide a viewing mode switching method of the backlight module as described above.

The method comprises a narrow viewing angle mode and a wide viewing angle mode. The narrow viewing angle mode being activated when the upper backlight unit is turned on and the lower backlight unit is turned off, and the wide viewing angle mode being activated when both the upper backlight unit and the lower backlight unit are turned on.

Another object of the present invention is to provide a display device.

The display device includes the backlight module as described above, and a display panel arranged on the backlight module.

The effectiveness of the present invention is that when the upper backlight unit is turned on and the lower backlight unit is turned off, the system operates in narrow viewing angle mode. In this mode, the first prism of the upper backlight unit is oriented with its tip facing the upper light guide plate, and the alignment of the light-emitting elements in the upper backlight unit matches the extended direction of the first prism. This setup generates a normal viewing angle and reduces side light output, achieving a narrow viewing angle effect. When both the upper and lower backlight units are turned on, the system switches to a wide viewing angle mode, where the lower backlight unit compensates for the energy required for side viewing angles. This design allows the backlight module to actively switch between wide and narrow viewing angle modes without the need for special display panels with switching functions or additional privacy filters, thereby reducing manufacturing costs while maintaining brightness.

DETAILED DESCRIPTION OF THE INVENTION

The detailed description and preferred embodiments of the invention will be set forth in the following content and provided for people skilled in the art to understand the characteristics of the invention.

The words "approximately", "approximately", "approximately" or "substantially" appearing in the content of this case not only cover the clearly stated numerical values and numerical ranges, but also covers the allowable deviation range that can be understood by a person with ordinary knowledge in the technical field to which the invention belongs. The deviation range can be determined by the error generated during measurement, and this error is caused, for example, by limitations of the measurement system or process conditions. In addition, "about" may mean within one or more standard deviations of the above numerical value, such as within ±10%, ±5%, ±3%, ±2%, ±1%, or ±0.5%. Words such as "about", "approximately" or "substantially" appearing in this text may be used to select acceptable deviation ranges or standard deviations based on optical properties, etching properties, mechanical properties, or other properties. Therefore, a single standard deviation is not applied to all the above optical properties, etching properties, mechanical properties, and other properties.

Figure 1:
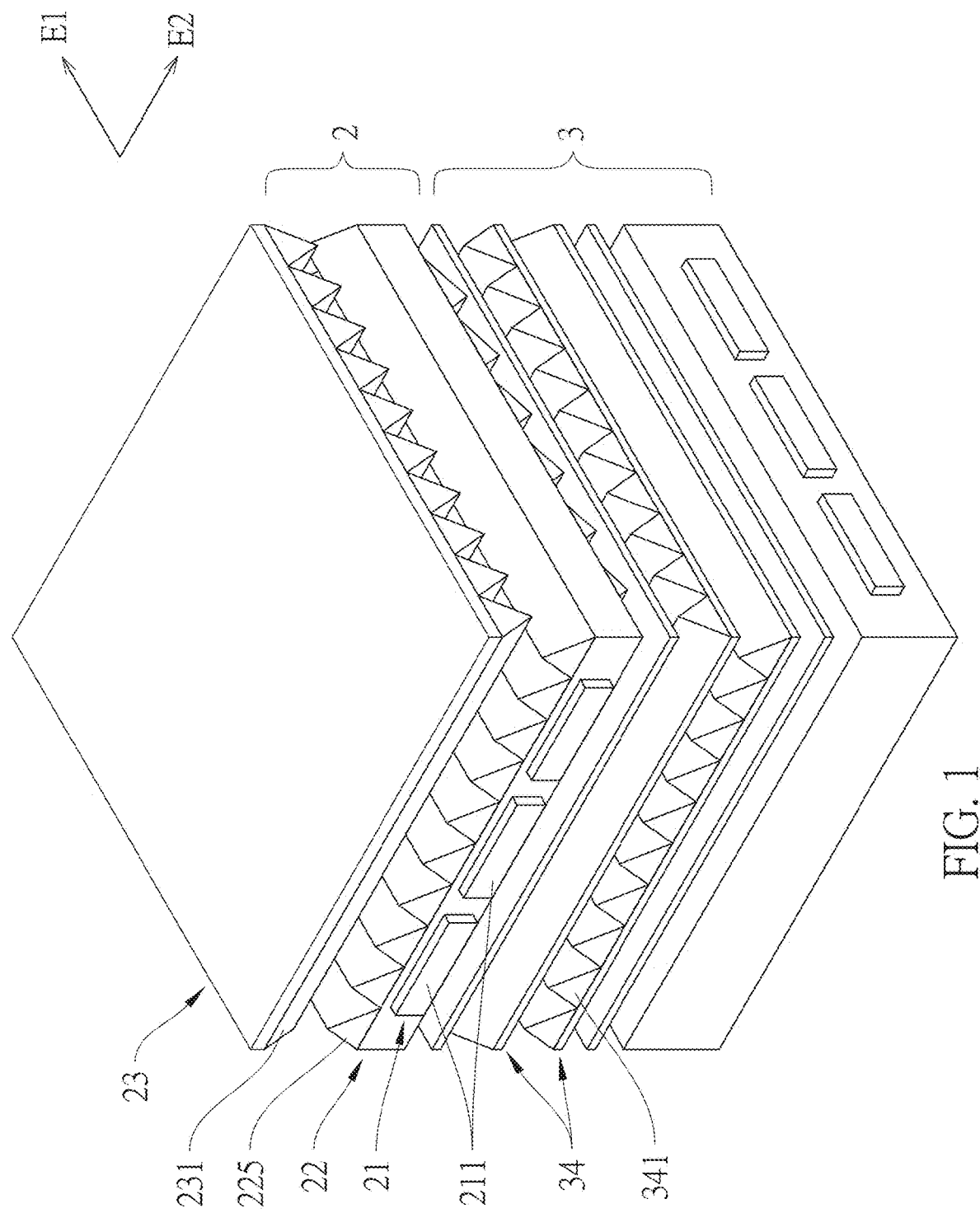
FIG. 1 is an exploded perspective diagram illustrating a preferred embodiment of the backlight module of the present invention, wherein a lower backlight unit is side-lit light source.

Referring to FIG. 1, it is a preferred embodiment of the backlight module of the present invention. The backlight module comprises an upper backlight unit 2 and a lower backlight unit 3 positioned beneath the upper backlight unit 2. The upper backlight unit 2 includes an upper light source 21, an upper light guide plate 22 that receives light emitted from the upper light source 21, and a first prism sheet 23 located on the light-emitting side of the upper light guide plate 22. The first prism sheet 23 includes a plurality of first prisms 231 arranged along a first direction E1, where the first prisms 231 extend along a second direction E2 and have their tips oriented towards the upper light guide plate 22. The upper light source 21 has a plurality of light-emitting elements 211 arranged along the second direction E2.

Through the above-described design, when the upper backlight unit 2 is turned on and the lower backlight unit 3 is turned off, the system operates in narrow viewing angle mode. In this mode, the first prism sheet 23 of the upper backlight unit 2 is oriented with its tip facing the upper light guide plate 22, and the alignment of the light-emitting elements 211 in the upper backlight unit 2 matches the extended direction of the first prism sheet 23. This setup generates a normal viewing angle and reduces side light output, achieving a narrow viewing angle effect. When both the upper backlight unit 2 and lower backlight unit 3 are turned on, the system switches to a wide viewing angle mode, where the lower backlight unit 3 compensates for the energy required for side viewing angles. This design allows the backlight module to actively switch between wide and narrow viewing angle modes without the need for special display panels with switching functions or additional privacy filters, thereby reducing manufacturing costs while maintaining brightness.

Figure 2:
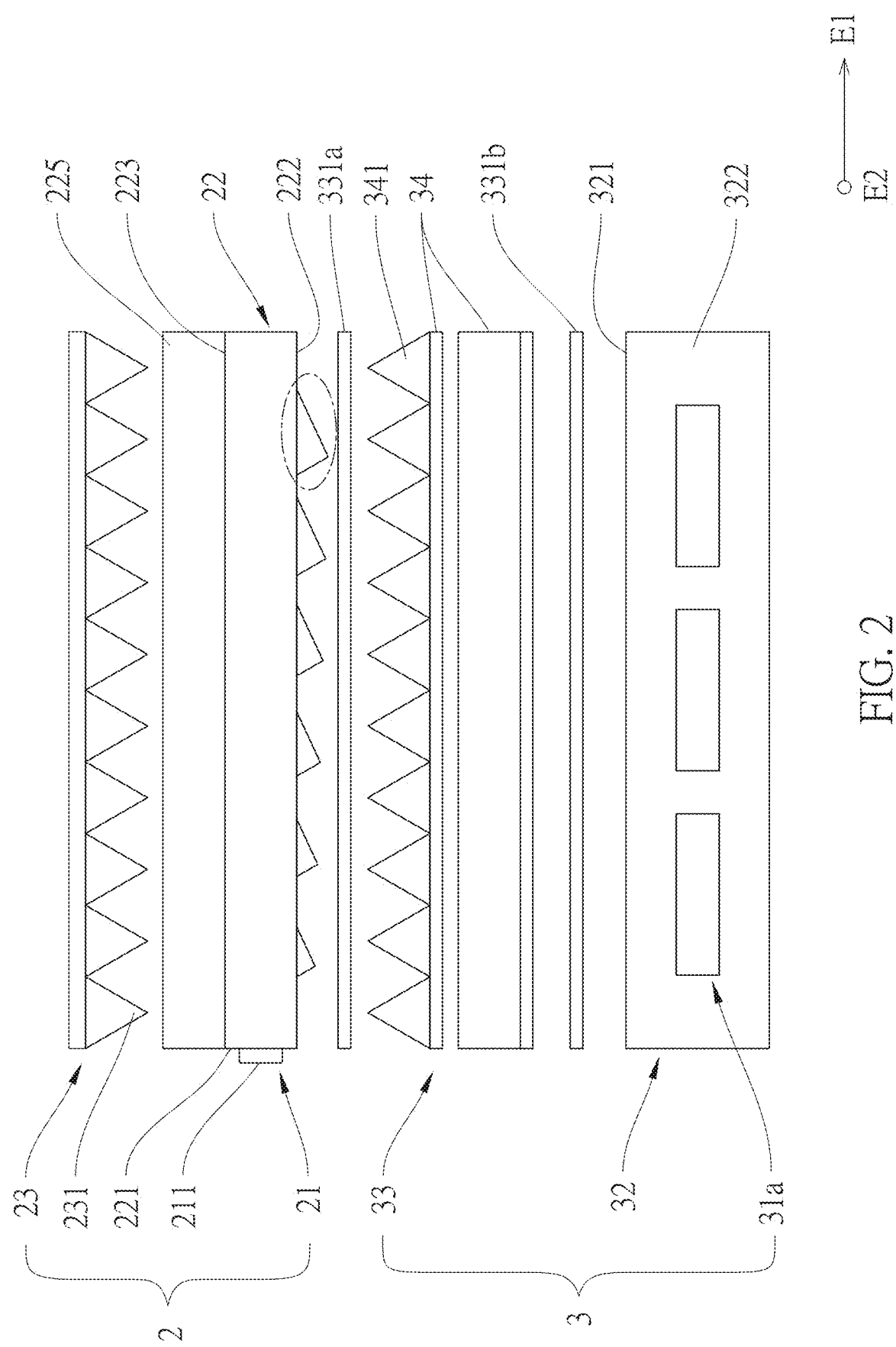
FIG. 2 is a top view diagram that assists in explaining FIG. 1.

Referring to FIG. 2, the upper light guide plate 22 includes an incident surface 221 oriented towards the upper light source 21, a bottom surface 222 connected to the incident surface 221 and facing the lower backlight unit 3, an exit surface 223 connected to the incident surface 221 and opposite to the bottom surface 222, a plurality of light control structures 224 disposed on the bottom surface 222, and a plurality of strip-shaped microstructures 225 disposed on the exit surface 223. The strip-shaped microstructures 225 are oriented toward the first prism sheet 23 and extend in the first direction E1, which is perpendicular to the extended direction of the first prism column 231. This configuration enhances the uniformity of light emission on the exit side of the upper light guide plate 22.

More specifically, the first prism sheet 23 of the upper backlight unit 2 is a reverse prism lens or turning film. The extended direction of the first prisms 231 of the first prism sheet 23 is aligned with the arrangement direction of the light-emitting elements 211 of the upper light source 21, both extending along the second direction E2. This alignment results in the light emission being collimated in the normal viewing angle, thereby providing an anti-peeping characteristic.

Figure 3:
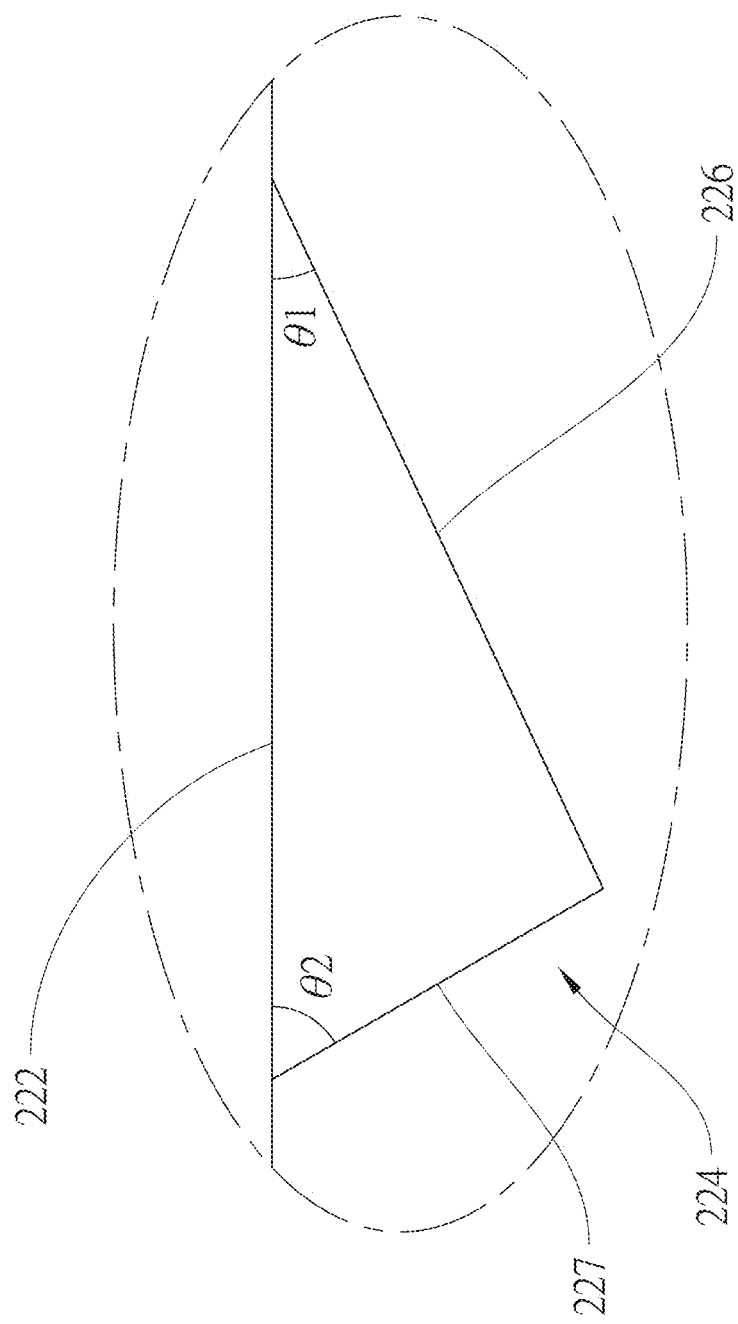
FIG. 3 is a partially enlarged diagram illustrating an enlargement of the framed area in FIG. 2.

Referring to FIG. 3, the reverse prism lens or turning film requires a specific range of incident light angles to convert light into a normal viewing angle output. Therefore, in this embodiment, each of the light control structures 224 is additionally designed with a light receiving surface 226 facing the incident surface 221 and a opposite light receiving surface 227 connected to the light receiving surface 226 and facing away from the incident surface 221. The light receiving surface 226 forms a first angle θ1 with the bottom surface 222, while the opposite light receiving surface 227 forms a second angle θ2 with the bottom surface 222. The first included angle θ1 is greater than the second included angle θ2. Since the light receiving surface 226 facing the incident surface 221 has a gentler slope compared to the steeper slope of the non-light receiving surface 227 facing away from the incident surface 221, the area of the light receiving surface 226 is larger. This design maximizes the guidance of light towards the first prism sheet 23, thereby further enhancing light utilization efficiency and uniformity.

Referring to FIG. 2, in more detail, in regions close to the upper light source 21, the area ratio of the light control structures 224 relative to the bottom surface 222 of the upper light guide plate 22 is smaller than in regions farther from the upper light source 21. One implementation involves having the size of the light control structures 224 in regions close to the upper light source 21 be smaller than in regions farther from the upper light source 21. Another implementation involves increasing the spacing between adjacent light control structures 224 in regions close to the upper light source 21 compared to the spacing between adjacent light control structures 224 in regions farther from the upper light source 21. In other words, the size of the light control structures 224 increases with the distance from the upper light source 21, while the spacing between adjacent light control structures 224 decreases as the distance from the upper light source 21 increases. This design approach utilizes a sparser distribution of light control structures 224 near the upper light source 21 and a denser distribution farther away to effectively use light source energy, ensuring high uniformity and energy efficiency.

As for the lower backlight unit 3, its style and light source placement position are not restricted. According to this embodiment, the lower backlight unit 3 includes a lower light source 31a, a lower light guide plate 32 that receives light emitted from the lower light source 31a, and at least one optical film 33 positioned on an exit side 321 of the lower light guide plate 32. The lower light guide plate 32 has an incident side 322 connected to the exit side 321. The incident side 322 receives the light emitted from the lower light source 31a. In this embodiment, the lower backlight unit 3 includes multiple optical films 33, comprising two diffusion sheets 331a and 331b, and two second prism sheets 34 positioned between these two diffusion sheets 331a and 331b. Each second prism sheets 34 includes a plurality of second prisms 341, with the tips of the second prisms 341 oriented towards the upper backlight unit 2. The second prisms 341 of the two second prism sheets 34 extend in different directions. The upper diffusion sheet 331a is directly facing the upper light guide plate 22 of the upper backlight unit 2, with no other components obstructing between them. Therefore, the light emitted from the lower backlight unit 3 can directly enter the upper backlight unit 2 without being obstructed by other components, which would otherwise reduce light transmission. Additionally, there is minimal reflection of light back into the lower backlight unit 3. This arrangement helps to enhance the brightness of the wide viewing angle mode.

The viewing angle switching method of the backlight module of the present invention is used to switch the viewing angle of the backlight module as shown in FIG. 1, including a narrow viewing angle mode and a wide viewing angle mode. The method operates as follows: when the upper backlight unit 2 is turned on and the lower backlight unit 3 is turned off, it is the narrow viewing angle mode. When both the upper backlight unit 2 and the lower backlight unit 3 are turned on, it is the wide viewing angle mode.

Figure 4:
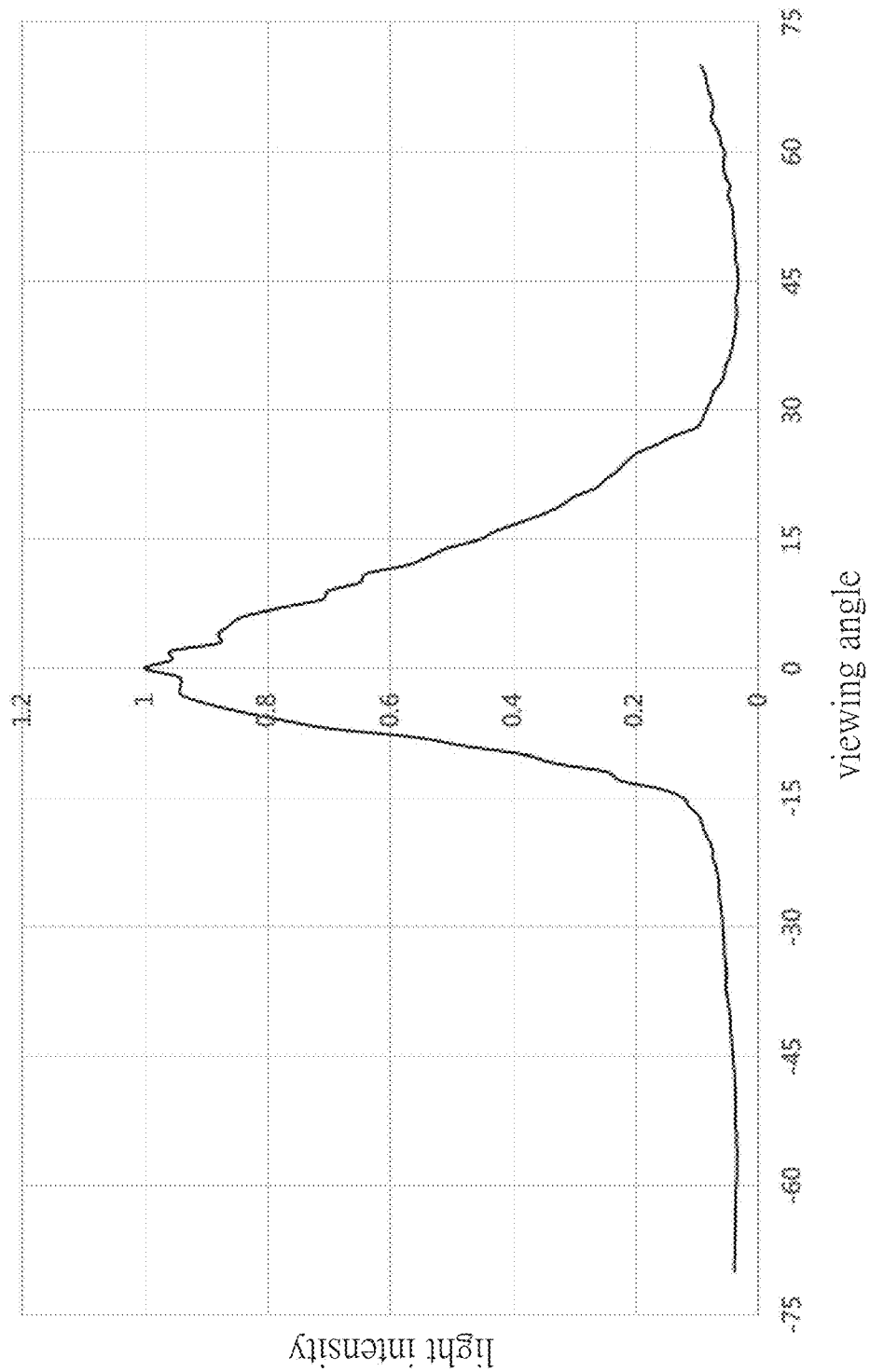
FIG. 4 is a curve chart illustrating the light distribution for the narrow viewing angle mode.

Referring to FIG. 2 and FIG. 3, when the upper backlight unit 2 is turned on, light from the upper light source 21 enters the upper light guide plate 22 through the incident surface 221. Part of this light will pass through the strip-shaped microstructures 225 and then enter the first prism sheet 23. Since the bottom surface 222 of the upper light guide plate 22 is provided with the light control structures 224, the angle design of the light receiving surface 226 reflects light traveling to the bottom surface 222 back into the upper light guide plate 22. This increases the amount of light entering the strip-shaped microstructures 225 from the upper light guide plate 22. The light passing through the strip-shaped microstructures 225 will then proceed through the first prism sheet 23 and exit. Since the first prism sheet 23 is a turning film or a reverse prism type with a relatively limited light receiving angle, the light control structures 224 are designed asymmetrically to enhance the proportion and reflection efficiency of the light receiving surface 226. Additionally, the strip-shaped microstructures 225 on the exit surface 223 of the upper light guide plate 22 disperse the light to improve uniformity. This design optimizes the light utilization efficiency of the first prism sheet 23, thereby increasing the light output efficiency of the upper light guide plate 22 at specific angles. Therefore, when the upper backlight unit 2 is turned on and the lower backlight unit 3 is turned off, the above configuration allows the light to exit at an angle close to 90 degrees. As shown in FIG. 4, this setup provides sufficiently intense collimated normal light at a 0-degree viewing angle, while the light intensity at ±45 degrees is less than 5% of that at the 0-degree angle, representing a narrow viewing angle mode. In this narrow viewing angle mode, it prevents individuals on the left and right sides from viewing the content displayed on the screen, offering a privacy protection effect. Thus, when applied to in-vehicle equipment other than dashboards (e.g., screens positioned in front of the passenger seat), switching to the narrow viewing angle mode can also prevent the driver from being distracted by the screen, enhancing driving safety.

Figure 5:
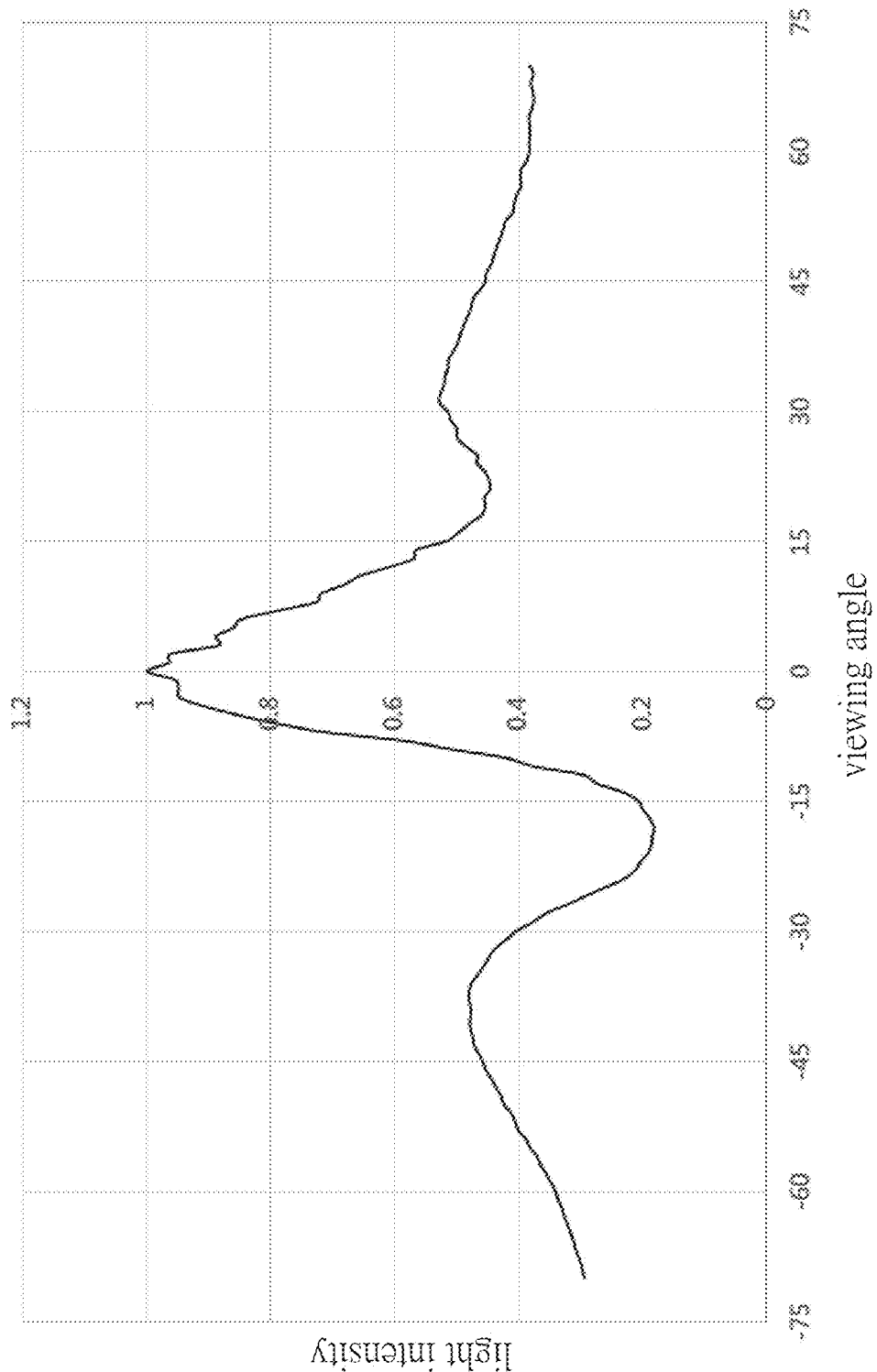
FIG. 5 is a curve chart illustrating the light distribution for the wide viewing angle mode.
Figure 6:
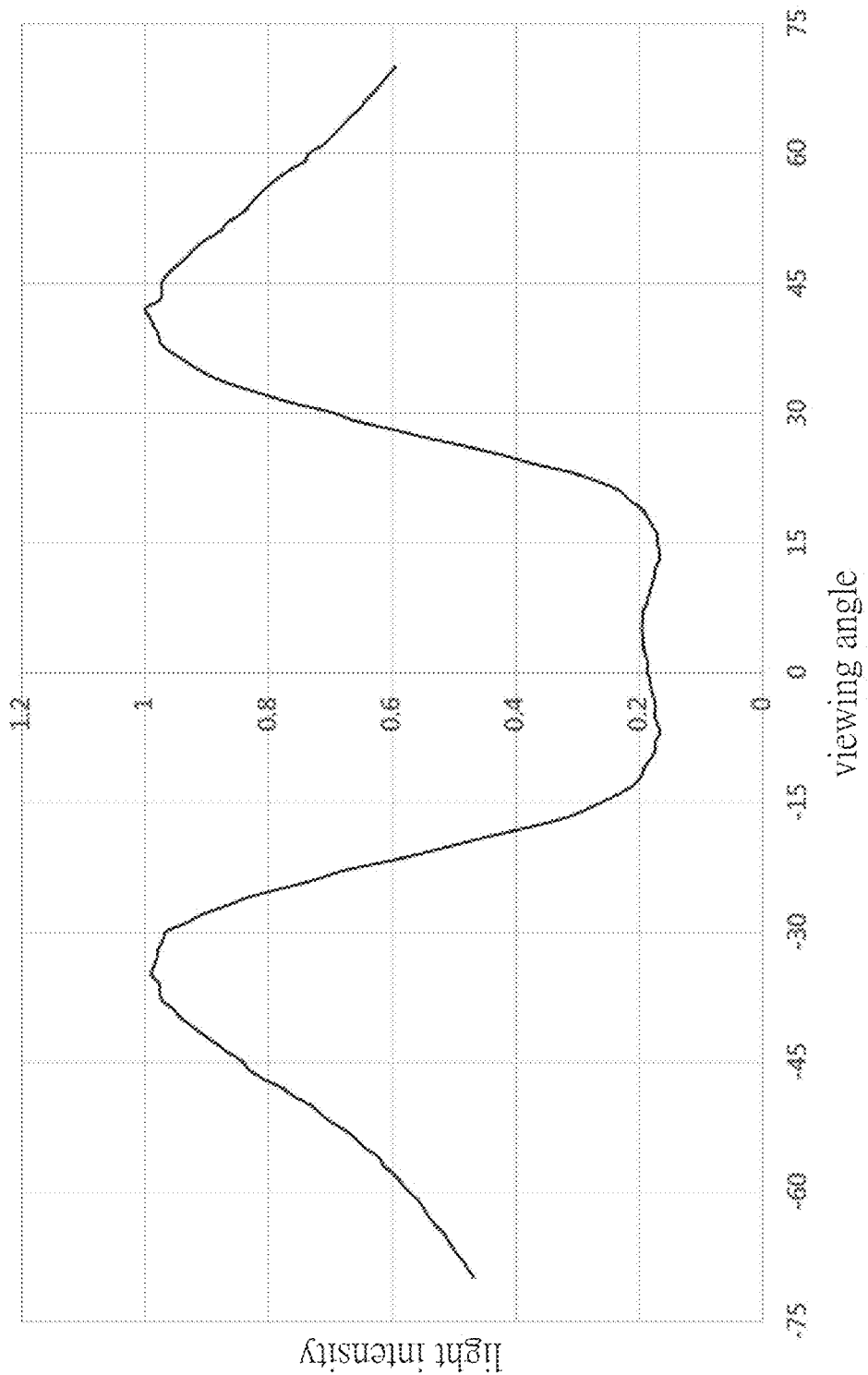
FIG. 6 is a curve chart illustrating the light distribution when the lower backlight unit is operated independently.

Referring to FIG. 2, when both the upper backlight unit 2 and the lower backlight unit 3 are turned on, light from the lower light source 31a enters the lower light guide plate 32 through the incident side 322. After exiting from the exit side 321, the light sequentially passes through the lower diffusion sheet 331b, the two second prism sheets 34, and the upper diffusion sheet 331a before entering the upper backlight unit 2. The second prisms 341 of the two second prism sheets 34 extend in different directions, allowing the light from the lower light source 31a to spread in various directions, thereby enhancing light uniformity. Additionally, it is important to note that the upper diffusion sheet 331a is directly facing the upper light guide plate 22 of the upper backlight unit 2, with no other components obstructing between them. Therefore, the light from the lower backlight unit 3 can directly enter the upper backlight unit 2 without any light being reflected back into the lower backlight unit 3, which helps to improve the overall brightness. When both the upper backlight unit 2 and the lower backlight unit 3 are turned on, as shown in FIG. 5, not only does the system provide sufficient intensity of collimated normal light at the 0-degree viewing angle, but the light intensity at ±45 degrees is also more than 45% (0.45) of that at the 0-degree angle, thus representing a wide viewing angle mode. In contrast, as shown in FIG. 6, when only the lower backlight unit 3 is activated, the light is split to form two broad beams on the left and right sides, resulting in a significantly insufficient light intensity at the 0-degree viewing angle.

Figure 7:
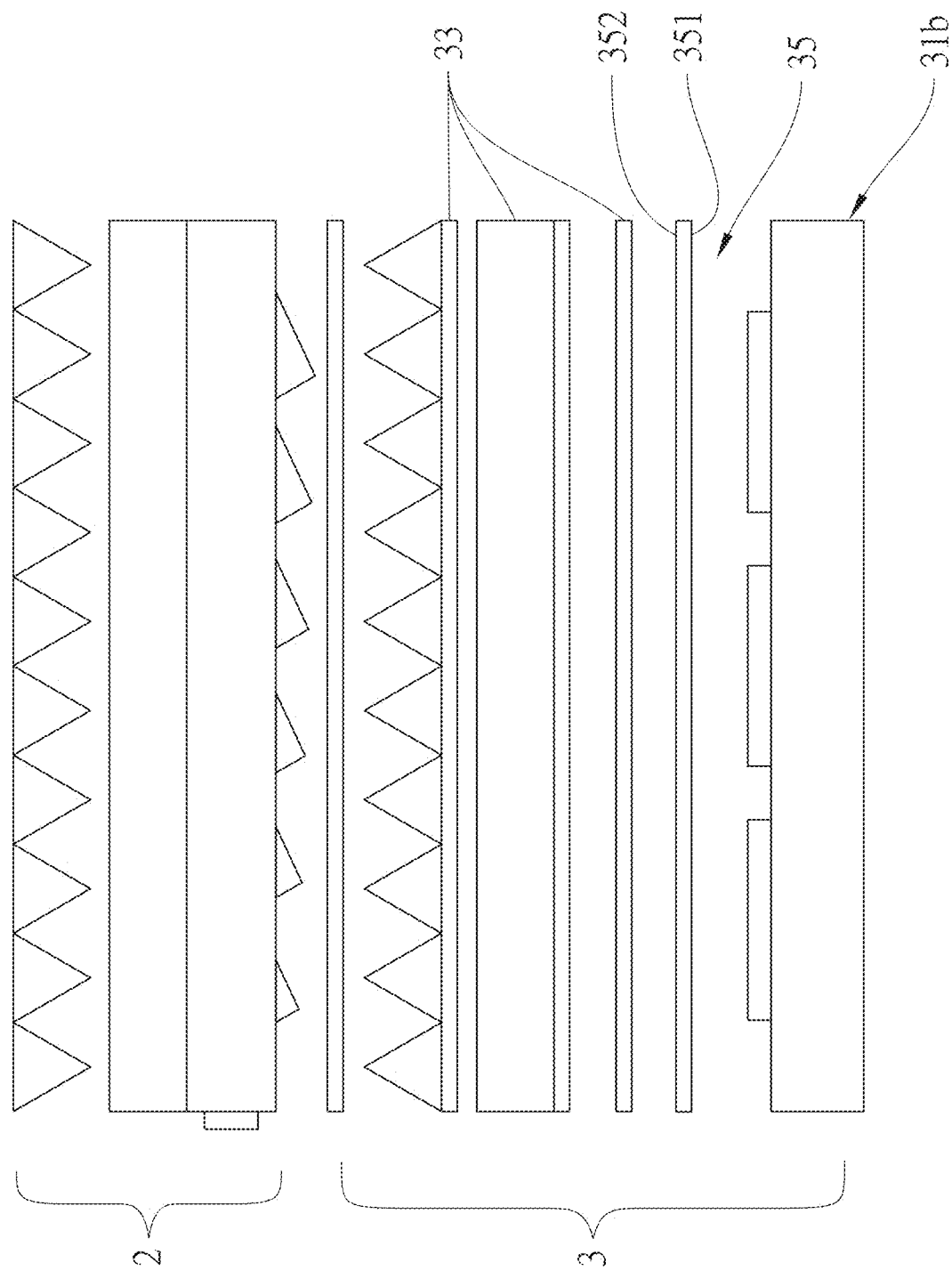
FIG. 7 is a side view diagram illustrating another form of the preferred embodiment, in which the lower backlight unit is a direct-lit light source.

As shown in FIG. 2, in this embodiment, the lower backlight unit 3 is a side-lit backlight structure. As illustrated in FIG. 7, in some embodiments, the lower backlight unit 3 may also be configured as a direct-lit backlight structure, which includes a lower light source 31b, a diffusion plate 35 that receives light from the lower light source 31b, and at least one optical film 33 located on an exit side 352 of the diffusion plate 35. The diffusion plate 35 also has an incident side 351 opposite to the exit side 352, where the incident light side 351 receives light emitted from the lower light source 31b.

Figure 8:
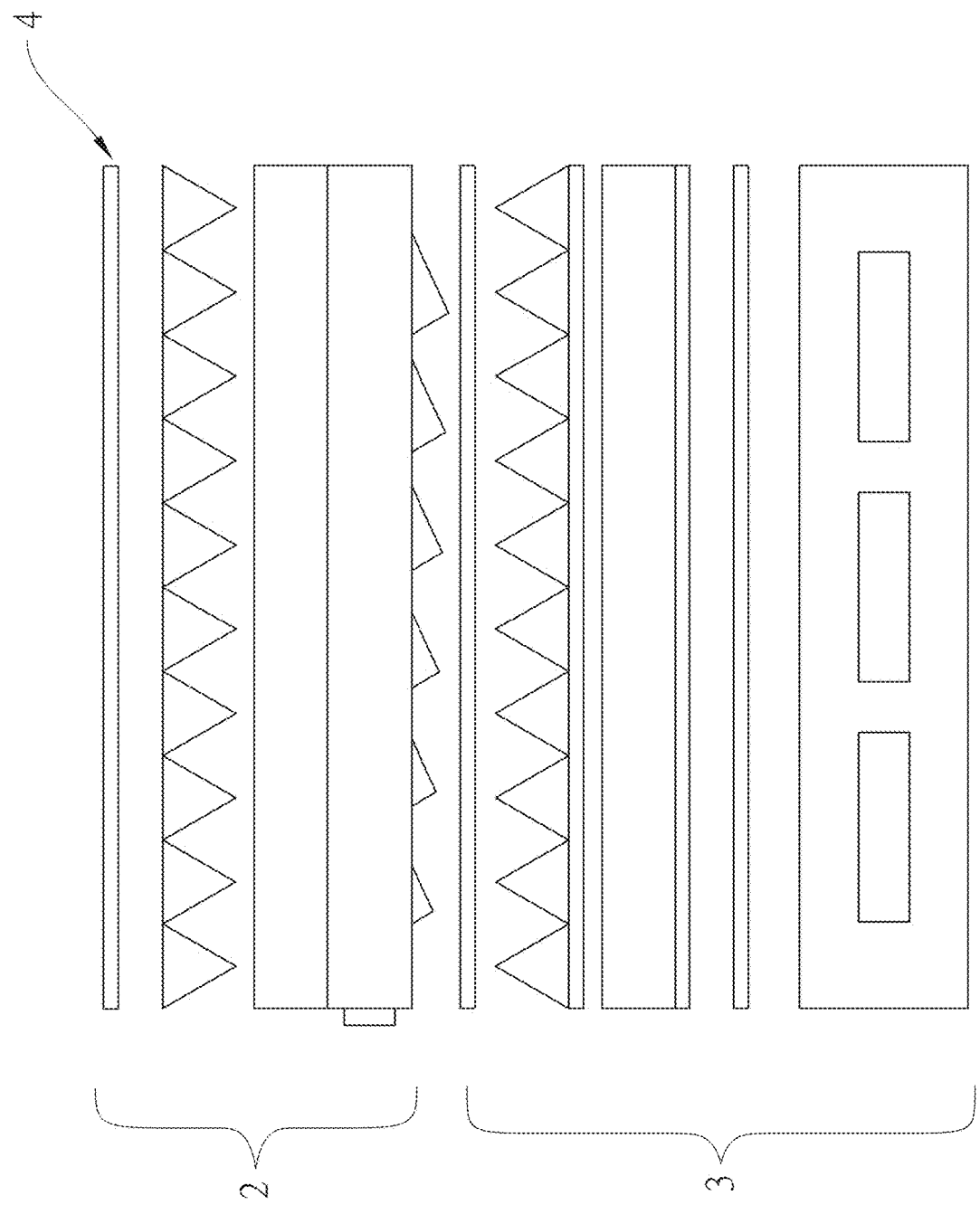
FIG. 8 is a side view diagram illustrating a preferred embodiment of the display device of the present invention.

As shown in FIG. 8, a display panel 4 is provided on the backlight module, which is the display device of the present invention. It should be noted that the display panel 8 may also be disposed on the backlight module shown in FIG. 7.

In summary, the backlight module and viewing angle switching method of the present invention utilize the simultaneous activation of the upper backlight unit 2 and the lower backlight unit 3 to provide a wide viewing angle mode. Conversely, activating only the upper backlight unit 2 while deactivating the lower backlight unit 3 provides a narrow viewing angle mode. Therefore, the backlight module and display device of the present invention feature the capability to switch between wide and narrow viewing angle modes. Additionally, the structural design of the upper light guide plate 22 enhances the light utilization efficiency of the first prism lens 23. Moreover the absence of other components between the upper light guide plate 22 of the upper backlight unit 2 and the upper diffusion sheet 331 of the lower backlight unit 3 helps to improve overall brightness in the wide viewing angle mode. Therefore, the backlight module of the present invention can actively switch between narrow and wide viewing angle modes without the need for specially designed display panels with switching functionality or additional anti-glare films, thereby reducing manufacturing costs while maintaining brightness.

Moreover, as the number of in-vehicle displays increases, there is a growing need for privacy protection. To avoid affecting the driver's line of sight and to enhance driving safety, the present invention satisfies both narrow viewing angle mode (privacy protection or privacy mode) and wide viewing angle mode (shared viewing or shared mode) by switching the light sources. This provides multifunctional usage under different scenario conditions. Specifically, when applied to automotive displays, the shared mode allows both the driver and passengers to view the screen content simultaneously, while the privacy mode prevents the driver from seeing the display content, thus avoiding driver distraction and protecting passenger privacy.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
  an upper backlight unit, including an upper light source, an upper light guide plate receiving light emitted from the upper light source, and a first prism sheet positioned on a light-exiting side of the upper light guide plate, wherein the first prism sheet includes a plurality of first prisms arranged along a first direction, each of the first prisms extending in a second direction with its tip facing the upper light guide plate, and the upper light source includes a plurality of light-emitting elements arranged along the second direction; and;
  a lower backlight unit, positioned beneath the upper backlight unit;
  wherein the upper light guide plate has an incident surface facing the upper light source, a bottom surface connecting to the incident surface and facing the lower backlight unit, and a plurality of light control structures disposed on the bottom surface;
  wherein at a position adjacent to the upper light source, the area ratio of the light control structures to the bottom surface of the upper light guide plate is smaller compared to the area ratio of the light control structures to the bottom surface of the upper light guide plate at a position farther from the upper light source.

2. The backlight module as claimed in claim 1, wherein each of the light control structures has an light receiving surface directed toward the incident surface and a opposite light receiving surface connected to the light receiving surface, wherein a first angle is formed between the light receiving surface and the bottom surface, and a second angle is formed between the opposite light receiving surface and the bottom surface, with the first angle being smaller than the second angle and both the first angle and the second angle are acute angles.

3. The backlight module as claimed in claim 1, wherein at a position adjacent to the upper light source, the size of the light control structures is smaller compared to the size of the light control structures at a position farther from the upper light source.

4. The backlight module as claimed in claim 1, wherein at a position adjacent to the upper light source, the spacing between adjacent light control structures is greater than the spacing between adjacent light control structures at a position farther from the upper light source.

5. The backlight module as claimed in claim 1, wherein the upper light guide plate further includes an exit surface connected to the incident surface and opposing the bottom surface, and a plurality of strip-shaped microstructures disposed on the exit surface, the strip-shaped microstructures being oriented toward the first prism sheet and extending along the first direction.

6. The backlight module as claimed in claim 1, wherein the lower backlight unit includes two diffusion sheets, with the upper diffusion sheet directly facing the upper light guide plate of the upper backlight unit, and no other components obstructing between them.

7. The backlight module as claimed in claim 1, wherein the lower backlight unit includes a lower light source, a lower light guide plate receiving light emitted from the lower light source, and at least one optical film positioned on an exit side of the lower light guide plate, wherein the lower light guide plate has an incident side connected to the exit side, with the incident side receiving light emitted from the lower light source.

8. The backlight module as claimed in claim 1, wherein the lower backlight unit includes a lower light source, a diffusion plate receiving light from the lower light source, and at least one optical film positioned on an exit side of the diffusion plate, wherein the diffusion plate has an incident side opposite the exit side, with the incident side receiving light emitted from the lower light source.

9. The backlight module as claimed in claim 7, wherein the lower backlight unit includes a plurality of optical films, the optical films comprise two diffusion sheets and two second prism sheets positioned between the two diffusion sheets, each of the second prism sheets including a plurality of second prisms, with the tips of the second prisms on each second prism sheet facing the upper backlight unit, and the second prisms of the two second prism sheets extending in different directions.

10. The backlight module as claimed in claim 8, wherein the lower backlight unit includes a plurality of optical films, the optical films comprise two diffusion sheets and two second prism sheets positioned between the two diffusion sheets, each of the second prism sheets including a plurality of second prisms, with the tips of the second prisms on each second prism sheet facing the upper backlight unit, and the second prisms of the two second prism sheets extending in different directions.

11. A viewing mode switching method of the backlight module as claimed in claim 1, comprising a narrow viewing angle mode and a wide viewing angle mode, wherein the narrow viewing angle mode being activated when the upper backlight unit is turned on and the lower backlight unit is turned off, and the wide viewing angle mode being activated when both the upper backlight unit and the lower backlight unit are turned on.

12. A display device, comprising the backlight module as claimed in claim 1, and a display panel arranged on the backlight module.

13. A backlight module, comprising:
an upper backlight unit, including an upper light source, an upper light guide plate receiving light emitted from the upper light source, and a first prism sheet positioned on a light-exiting side of the upper light guide plate, wherein the first prism sheet includes a plurality of first prisms arranged along a first direction, each of the first prisms extending in a second direction with its tip facing the upper light guide plate, and the upper light source includes a plurality of light-emitting elements arranged along the second direction; and
a lower backlight unit, positioned beneath the upper backlight unit;
wherein the lower backlight unit includes a plurality of optical films, the optical films comprise stacked at least one diffusion sheet and at least one second prism sheet, the at least one second prism sheet includes a plurality of second prisms, with the tips of the second prisms facing the upper backlight unit.

14. The backlight module as claimed in claim 13, wherein the upper light guide plate has an incident surface facing the upper light source, a bottom surface connecting to the incident surface and facing the lower backlight unit, and a plurality of light control structures disposed on the bottom surface, each of the light control structures has an light receiving surface directed toward the incident surface and a opposite light receiving surface connected to the light receiving surface, wherein a first angle is formed between the light receiving surface and the bottom surface, and a second angle is formed between the opposite light receiving surface and the bottom surface, with the first angle being smaller than the second angle and both the first angle and the second angle are acute angles.

15. The backlight module as claimed in claim 14, wherein the upper light guide plate further includes an exit surface connected to the incident surface and opposing the bottom surface, and a plurality of strip-shaped microstructures disposed on the exit surface, the strip-shaped microstructures being oriented toward the first prism sheet and extending along the first direction.

16. The backlight module as claimed in claim 13, wherein the quantity of the at least one diffusion sheet is two, the quantity of the at least one second prism sheet is two, the two second prism sheets positioned between the two diffusion sheets, and the second prisms of the two second prism sheets are extending in different directions.

17. A viewing mode switching method of the backlight module as claimed in claim 14, comprising a narrow viewing angle mode and a wide viewing angle mode, wherein the narrow viewing angle mode being activated when the upper backlight unit is turned on and the lower backlight unit is turned off, and the wide viewing angle mode being activated when both the upper backlight unit and the lower backlight unit are turned on.

18. A display device, comprising the backlight module as claimed in claim 13, and a display panel arranged on the backlight module.

* * * * *